April 23, 1946.  C. E. KLUMB  2,399,043
HAND LIFT TRUCK
Filed Sept. 29, 1944
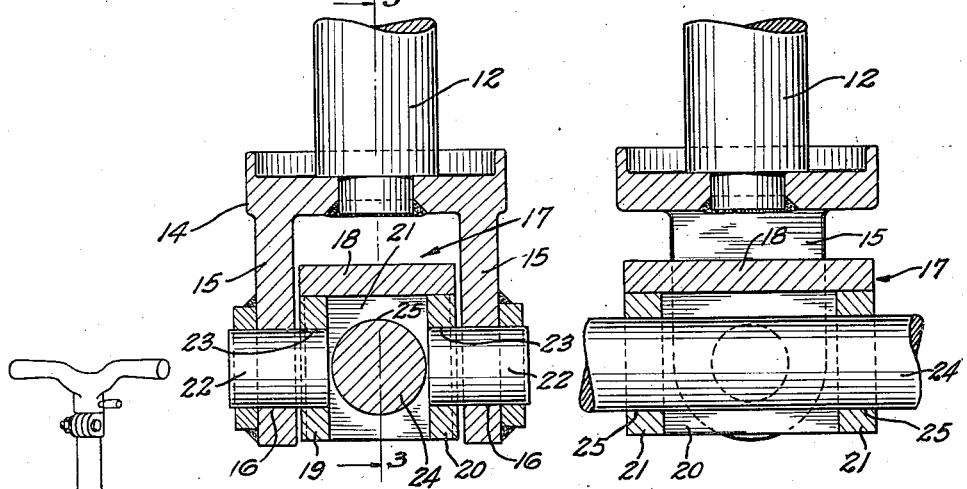
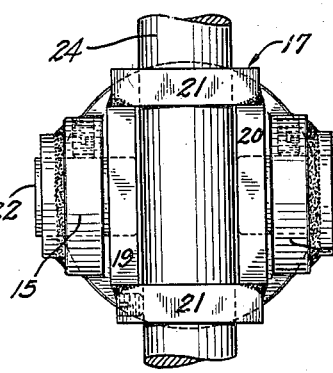
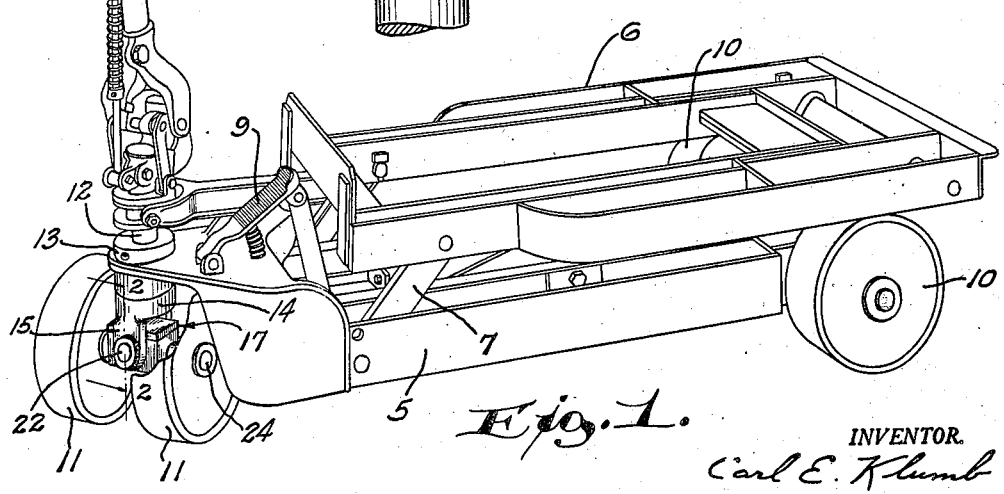
INVENTOR.
Carl E. Klumb
BY
Morsell & Morsell
ATTORNEYS.

Patented Apr. 23, 1946

2,399,043

UNITED STATES PATENT OFFICE 2,399,043

HAND LIFT TRUCK

Carl E. Klumb, West Bend, Wis., assignor to West Bend Equipment Corporation, West Bend, Wis., a corporation of Wisconsin Application September 29, 1944, Serial No. 556,304

2 Claims. (Cl. 280—85)

This invention relates to improvements in hand lift trucks.

In the manufacture of small trucks, such as hand lift trucks, it is common practice to support the frame on two relatively widely spaced rear wheels and on a pair of steerable front wheels which are positioned relatively close together. In the usual construction these front wheels are about six inches apart. Inasmuch as these trucks are used principally on factory or warehouse floors which may have a warped or uneven surface, considerable difficulty has been encountered. Frequently one front wheel would contact the floor and the other front wheel would be entirely out of engagement with the floor. When the truck is being used for transportation or for lifting operations this condition obviously provides an unsteady support and also renders steering difficult.

It is a general object of the present invention to obviate the above-mentioned objectionable features by providing a hand lift truck wherein the front wheels are so mounted as to be tiltable on a horizontal axis extending transversely of the axis of rotation of the wheels so that the condition of floor contact is automatically equalized to compensate for an uneven surface.

A more specific object of the invention is to provide in a hand lift truck having a vertically disposed steering spindle, a clevis member rigidly connected to the lower end of said steering spindle, and wheel-carrying means pivoted in said clevis on a horizontal axis which extends transversely of the axis of rotation of the wheels.

A further specific object of the invention is to provide a construction as above described wherein the wheel-carrying means comprises a pivoted axle supporting block.

A further object of the invention is to provide a construction as above described which is relatively simple to manufacture, which does not add materially to the cost of the truck, which is strong and durable, and which is otherwise well adapted for the purpose described.

With the above and other objects in view, the invention consists of the improved hand lift truck and all its parts and combinations, as set forth in the claims, and all equivalents thereof.

In the accompanying drawing illustrating one complete embodiment of the preferred form of the invention, in which the same reference numerals designate the same parts in all of the views, Fig. 1 is a perspective view of one type of hand lift truck showing the invention embodied therein, part of one of the front wheels being broken away;

Fig. 2 is a fragmentary sectional view on an enlarged scale taken approximately on the line 2—2 of Fig. 1;

Fig. 3 is a sectional view taken on the line 3—3 of Fig. 2; and

Fig. 4 is a bottom view of the improved wheel mounting arrangement, the ends of the axle being broken away.

Referring more particularly to the drawing, the lift truck, illustrated in Fig. 1, may be any one of a number of types. For purposes of illustration, however, the invention has been shown as applied to an hydraulically operated hand lift truck. The invention is, however, equally applicable to non-hydraulic hand lift trucks.

In Fig. 1 of the drawing the numeral 5 indicates the main chassis, and the numeral 6 designates a lifting platform. The platform is suitably connected by means of pivoted links 7 to the chassis therebelow. In the truck illustrated there is an hydraulic cylinder (not illustrated) which serves to raise the platform 6 when fluid is pumped into the cylinder by operation of the handle 8. This arrangement is well known in the art and it is unnecessary to describe or illustrate the details thereof. The foot pedal 9 serves to lower the platform.

The chassis 5 is supported on relatively widely spaced rear wheels 10 and on relatively closely spaced front wheels 11. The steering handle 8 is suitably connected to the upper end of a steering spindle 12 in such a way that a swinging movement of the handle will cause rotation of the spindle in a bearing 13 secured to the front end of the chassis 5.

The lower end of the spindle 12 below the bottom of the bearing 13 is rigidly connected to a clevis member 14, said clevis member having depending arms 15 formed with alined openings 16.

An axle supporting block, designated generally by the numeral 17, comprises a top plate 18, a front plate 19, a rear plate 20 and end plates 21. All of these parts are rigidly secured together in any desired manner such as by welding.

Trunnions 22 have their inner ends rigidly secured in holes 23 of the front and rear plates 19 and 20. The outer ends of the trunnions project rotatably through the openings 16 of the clevis arms 15. It is thus apparent that the block 17 may pivot within the clevis through the medium of the trunnions 22.

Axle member 24 extends longitudinally through the block 17 and within the confines of the interior thereof. The ends of the axle project through openings 25 in the end walls of the block 17. On the extreme ends of the axle the wheels 11 are rotatably mounted in the usual manner. These wheels are about six inches apart.

It is apparent from the above that swinging movement of the handle 8 will cause steering movement of the wheels 11 simultaneously. It is also clear that when the truck is being moved or steered that the wheel supported block can pivot on a horizontal axis extending transversely of the axis of rotation of the wheels to permit one wheel to enter a depression or low spot of the floor without throwing the whole truck off balance. This equalizer construction also furnishes firm support for the truck during lifting operations even though this truck is standing on an uneven floor portion.

This type of truck is commonly employed in factories and warehouses for insertion beneath skids or pallets. After being inserted beneath a skid loaded with articles to be moved, the platform of the lift truck may be elevated to lift the skid off of the floor. The truck may then be used to move the skid, together with the material thereon, to a desired new location.

Various changes and modifications may be made without departing from the spirit of the invention, and all of such changes are contemplated as may come within the scope of the claims.

What I claim is:

1. In a hand lift truck having a chassis, spaced rear wheels supporting the rear end of said chassis, steering mechanism at the front end of the chassis, a front axle, a wheel mounted on each end of said axle, a clevis at the lower end of the steering mechanism, and a block having a longitudinal opening and having trunnions projecting exteriorly from said block and engageable with said clevis to support the block for tilting movement on a horizontal axis extending transversely of the axis of rotation of the wheels, the inner ends of said trunnions terminating short of the longitudinal opening of the block and the front wheel axle extending through the longitudinal opening of said block and being tiltable therewith.

2. In a hand lift truck having a chassis, rear wheels supporting the rear end of said chassis, a vertical steering spindle at the front end of the chassis, a front axle, a wheel mounted on each end of said axle, a clevis rigidly connected to the lower end of the steering spindle and projecting downwardly therefrom, a hollow block having front and rear walls and having end walls formed with alined openings, and trunnions projecting exteriorly from the front and rear walls of the block and engageable with said clevis to support the block for tilting movement on a horizontal axis extending transversely of the axis of rotation of the wheels, the front wheel axle extending through said openings in the end walls of the block and being tiltable therewith.

CARL E. KLUMB.